UNITED STATES PATENT OFFICE.

ALFRED MONNIER, OF PHILADELPHIA, PENNSYLVANIA.

IMPROVEMENT IN TREATING METALLIC AND ALKALINE SULPHATES TO SEPARATE COPPER, &c.

Specification forming part of Letters Patent No. 121,799, dated December 12, 1871.

*To all whom it may concern:*

Be it known that I, ALFRED MONNIER, of Philadelphia, in the State of Pennsylvania, have invented a new and useful Process for the Separation of the Metals from a Mixture of Metallic and Alkaline Sulphates, of which process the following is a specification:

To a mixture of sulphates, such, for example, as the sulphate of copper and sulphate of soda, obtained by crystallization or evaporation to dryness, I add charcoal, stone-coal, bituminous coal, or their equivalents, in small pieces of about the size of pea-coal, and in quantity about one-half the quantity of sulphate. I then calcine this mixture in an ordinary reverberatory furnace, stirring the mixture from time to time, and maintaining it at a bright-red heat as long as blue-yellow flames jet out from the mass. In this way both copper and soda are converted into sulphurets, which are easily separated by lixiviation. The sulphuret of sodium is subsequently converted into sulphate of soda in the usual way, and the insoluble sulphuret of copper alone, or, preferably, dampened with sulphuric acid, is then calcined in a reverberatory furnace at a low red heat, by which it is converted into sulphate. In case the sulphate of iron is present in the mixture of sulphates under treatment the iron will become a sulphuret, and there results a mixture of the sulphurets of iron and copper. Then, by calcination of these, the sulphuret of iron is decomposed, leaving the copper or sulphate of copper; and by evaporation and crystallization a good commercial article is obtained.

If I wish to obtain the metal as oxide, I dispense with the use of sulphuric acid and push the calcination to complete oxidation.

I claim—

The treatment of mixed metallic and alkaline sulphates for the purpose of separating them, substantially as described.

ALFRED MONNIER.

Witnesses:
CHAS. PARHAM,
THOS. A. BURTT.

(35)